(12) United States Patent
Zhang et al.

(10) Patent No.: US 12,182,126 B2
(45) Date of Patent: Dec. 31, 2024

(54) SYSTEMS AND METHODS FOR ASSOCIATING DATA ENTRIES

(71) Applicant: SAP SE, Walldorf (DE)

(72) Inventors: Lu Zhang, Bellevue, WA (US); Nichole Haas, Monroe, WA (US); Joshua Manoj, Bellevue, WA (US); Sri Raja Harshini Koka, Bellevue, WA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/531,546

(22) Filed: Nov. 19, 2021

(65) Prior Publication Data

US 2022/0083555 A1 Mar. 17, 2022

Related U.S. Application Data

(63) Continuation of application No. 16/201,807, filed on Nov. 27, 2018, now Pat. No. 11,210,293.

(51) Int. Cl.
*G06F 16/2455* (2019.01)
*G06F 16/23* (2019.01)

(52) U.S. Cl.
CPC .... *G06F 16/24558* (2019.01); *G06F 16/2379* (2019.01)

(58) Field of Classification Search
CPC ........... G06F 16/24558; G06F 16/2379; G06F 16/256; G06F 16/2365; G06F 16/2474; G06F 16/258
See application file for complete search history.

(56) References Cited

U.S. PATENT DOCUMENTS

| | | | |
|---|---|---|---|
| 5,850,507 A | 12/1998 | Ngai et al. | |
| 8,495,077 B2 * | 7/2013 | Bayliss | G06F 16/282 |
| | | | 707/758 |
| 8,639,596 B2 | 1/2014 | Chew | |
| 8,825,502 B2 * | 9/2014 | Bormann | G16H 10/60 |
| | | | 705/2 |
| 9,336,256 B2 | 5/2016 | Boukobza | |
| 9,514,123 B2 * | 12/2016 | Goel | G06F 16/134 |
| 10,108,688 B2 * | 10/2018 | Busch | G06F 16/27 |
| 2001/0042087 A1 | 11/2001 | Kephart et al. | |
| 2002/0016764 A1 | 2/2002 | Hoffman | |
| 2005/0273452 A1 * | 12/2005 | Molloy | G06F 16/284 |
| 2008/0103822 A1 | 5/2008 | Arora et al. | |

(Continued)

*Primary Examiner* — Cheyne D Ly
(74) *Attorney, Agent, or Firm* — Fountainhead Law Group, PC

(57) ABSTRACT

In one embodiment, a first entry in a first database is modified to include data from a highest-ranked one of one or more available data tables that correspond to the first entry. Each of one or more characters fields of the modified first entry are converted into a respective one or more first-entry tokens, and each of one or more character fields of each of a plurality of second entries in a second database is converted into a respective one or more second-entry tokens. The first-entry tokens are compared to the second-entry tokens, and, in response to the comparison, it is determined whether the first entry matches one of the second entries. In response to determining that the first entry matches one of the second entries, the first entry and the matching second entry are associated with one another in one or both the first and second databases.

20 Claims, 6 Drawing Sheets

(56) References Cited

U.S. PATENT DOCUMENTS

| | | |
|---|---|---|
| 2008/0222111 A1* | 9/2008 | Hoang .................... G06F 16/21 |
| 2009/0287600 A1 | 11/2009 | Amorosa et al. |
| 2010/0318640 A1 | 12/2010 | Mehta et al. |
| 2011/0295864 A1 | 12/2011 | Betz et al. |
| 2013/0085905 A1 | 4/2013 | Menon |
| 2014/0337331 A1* | 11/2014 | Hassanzadeh ........ G06F 16/273 |
| | | 707/726 |
| 2016/0078566 A1 | 3/2016 | Farrell et al. |
| 2017/0116206 A1* | 4/2017 | Gumerato ............. G06F 16/275 |
| 2019/0295158 A1 | 9/2019 | Wu |

* cited by examiner

SYSTEMS AND METHODS FOR ASSOCIATING DATA ENTRIES

CROSS-REFERENCE TO RELATED APPLICATION

This application is a continuation of U.S. patent application Ser. No. 16/201,807, filed Nov. 27, 2018. The entire contents of U.S. patent application Ser. No. 16/201,807 is incorporated herein by reference in its entirety for all purposes.

BACKGROUND

The present disclosure relates to computing and data processing, and in particular, to systems and methods for matching and associating data entries, for example, in respective databases.

The widespread adoption of using computers for data processing has led to number of challenges. One challenge stems from the desirability of linking, or otherwise associating, a data entry in one database with a data entry in another database, where both databases may be part of, or may be configured to communicate with one another via, a cloud or other computing system. For example, an entity (e.g., a company) may prefer that a data entry related to a member's (e.g., employee's) travel itinerary (e.g., airfare or hotel reservation) and stored in an itinerary (transactional) database be linked, or otherwise associated, with the corresponding entry in the member's expense report stored in an expense-reporting (analytical processing) database. These challenges are compounded, for example, where the corresponding data entries are entered into their respective databases at different times, sometimes days, weeks, or even months apart, and where each of one or more of the databases includes a large number of corresponding data entries that are not linked, or otherwise associated, with one another.

SUMMARY

Embodiments of the present disclosure pertain to systems and methods for associating data entries in respective databases. In one embodiment, the present disclosure pertains to systems and methods for matching and associating corresponding data entries in respective databases. A first data entry in a first data base is modified to include data from a highest-ranked one of one or more available data tables that correspond to the first data entry. Each of one or more characters fields of the modified first data entry is converted into a respective one or more first-entry tokens, and each of one or more character fields of each of a plurality of second entries in a second database are converted into a respective one or more second-entry tokens. The first-entry tokens are compared to the second-entry tokens, and, in response to the comparison, it is determined whether the first data entry matches one of the second data entries. In response to determining that the first data entry matches one of the second data entries, the first data entry and the matching second data entry are associated with one another, for example, in one or both of the first and second databases.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
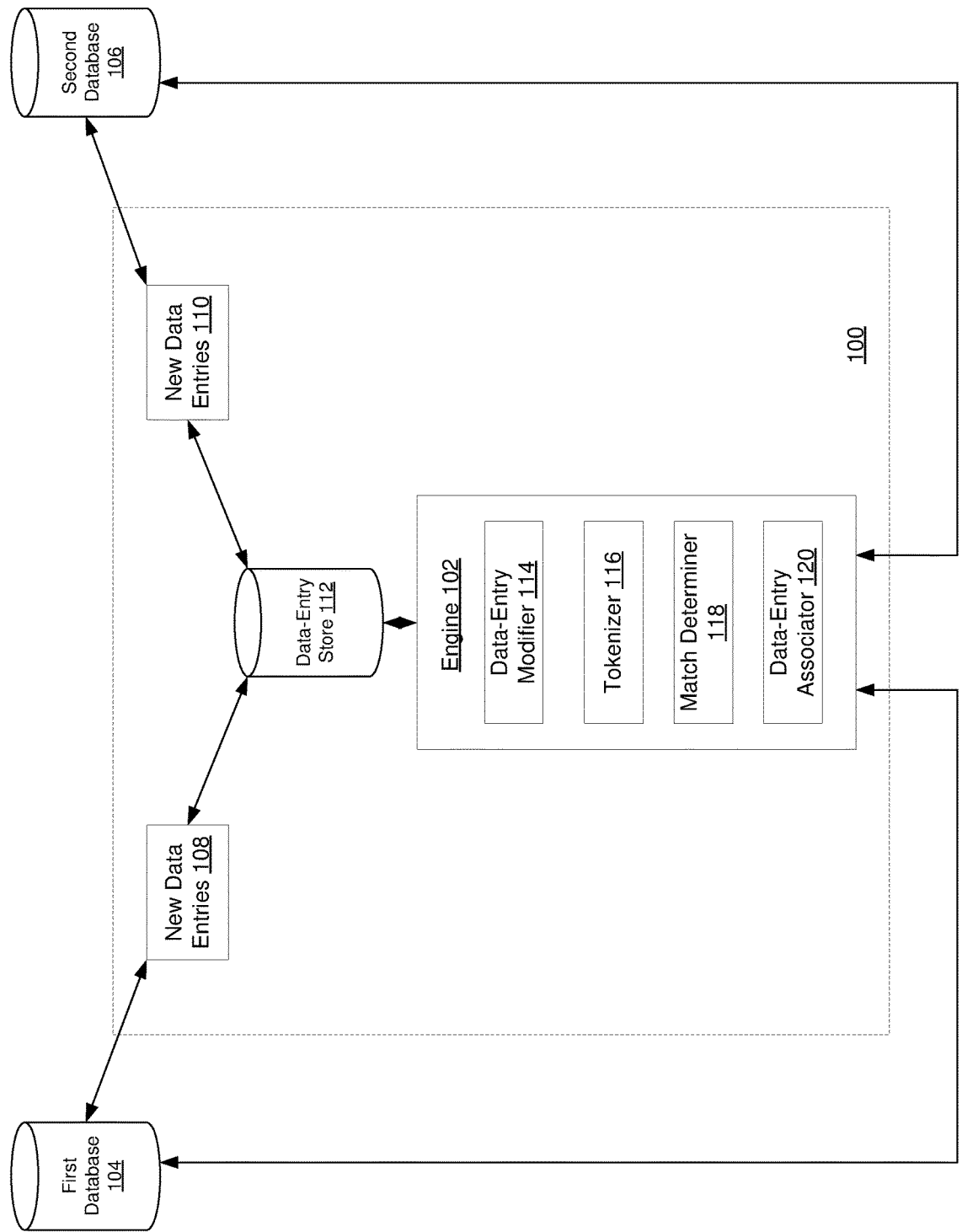
FIG. 1 illustrates an architecture for associating a data entry in one database with a corresponding data entry in another database, according to an embodiment.

FIG. 1 illustrates an architecture 100 for associating a data entry in one database with a data entry in another database, according to an embodiment. Features and advantages of the present disclosure include automatically associating an entry in a record, such as an expense report, stored in one database, with an entry in a record, such as a travel-itinerary transaction, stored in another database. For example, if one's purchase of an airline ticket is stored in a travel-itinerary database, and he/she enters the cost of the purchase in his/her expense report, which is stored in a separate expense-report database, then the architecture 100 can associate the two data entries and can indicate the association in one or both of the databases. As a further example, a data entry that is stored in an expense-report database and that corresponds to a data entry in a travel-itinerary database may not be initially associated with the corresponding data entry in the travel-itinerary database. Embodiments of the architecture may associate the data entry in the expense database with the corresponding data entry in the travel-itinerary database, for example.

Features and advantages of the present disclosure include a match-detection-and-data-entry-association engine 102, which is configured to detect a match between a first data entry in a first database 104 and a second data entry in a second database 106, and to link, or otherwise to associate, the first and second data entries in at least one of the first and second databases. For example, the engine 102 is configured to associate a previously unassociated entry in an expense report stored in the first database 104 by matching the expense-report entry to, and associating the expense-report entry with, an entry in a travel itinerary stored in the second database 106.

In addition to the engine 102, the architecture 100 includes new-data-entries engines 108 and 110, and a data-entry store 112.

Furthermore, the engine 102 includes a data-entry modifier 114, a tokenizer 116, a match determiner 118, and a data-entry associator 120.

The first and second databases 104 and 106 continuously receive new data entries. For example, where the first and second databases 104 and 106 are expense-report and travel-itinerary databases, respectively, the first database continuously receives new expense reports, which each include one or more expense data entries, and the second database continuously receives new itinerary entries, such as airfare purchases, car-rental reservations, hotel reservations, and rail-passage reservations. These types of itinerary data entries also can be called travel-segment data entries and can be abbreviated ARCH.

Each of the new-data-entries engines 108 and 110 periodically updates the data-entry store 112 with the new data entries in the first database 104 and the second database 106, respectively, such that the data-entry store includes all data entries from both the first and second databases for a set period of time. For example, the engines 108 and 110 may update the data-entry store 112 daily to include at least the most recent six months of data entries from both the first and second databases 104 and 106. The new-data-entries engines 108 and 110, or the engine 102, also can remove, from the data-entry store 112, data entries that are outside of the set period of time, for example, data entries over six months old.

The tokenizer 116 converts all of the character fields in the data-entry store 112 into tokens as the new-data-entries engines 108 and 110 update the data-entry store with new data entries. For example, the tokenizer 116 can use a "sliding window" of a set length to convert all of the character fields into tokens. Further in example, for the character field RESIDENCE, for a window three characters long, and for a window step of one character, the tokenizer 116 effectively steps the three-character window from right to left, one character at a time, to generate the following tokens: RES, ESI, SID, IDE, DEN, ENC, and NCE. Due to the stepping of the window in one-character increments, the tokens overlap one another. For example, the first two tokens overlap with the characters ES, the second and third tokens overlap with characters SI, and so on. If, however, the step size is greater than or equal to the window size, then the tokens do not overlap. Alternatively, as described below, the tokenizer 116 may not tokenize character fields that must exactly match to find matching data entries.

Next, the tokenizer 116 weights each token with a value indicative of how helpful the token is anticipated to be, statistically, in indicating a match between data entries. For example, the tokenizer 116 can be configured to weight each token with a "term frequency-inverse document frequency" (herein, "tf-idf") value. The statistical theory behind tf-idf is that the more frequently a token appears in the data entries stored in the data-entry store 112, the less likely the token is to indicate a match between data entries. For example, the tokenizer 116 may weigh the token INN with a lower tf-idf value because many lodging venues include the word "Inn" in their names, and, therefore, the discovery of the token INN in two data entries is less likely to indicate that the data entries refer to the same lodging venue. Conversely, the tokenizer 116 may weight the token HIL with a higher tf-dif value because fewer lodging venues (e.g., Hilton®) include the string HIL in their names.

The tokenizer 116 then stores each token, and its corresponding weight, in the data-entry store 112 or in another memory that the architecture 100 includes, or to which the architecture otherwise has access.

Furthermore, the engine 102 detects, and effectively filters or screens out, data entries in the first database 104 that are not candidates for matching to data entries in the second database 106. For example, where the first database 104 stores expense data entries, the engine 102 may exclude, from the below-described matching inquiry, expense data entries in expense reports that have not yet been submitted to a company for approval, expense data entries in expense reports that have been submitted for approval but have not yet been approved, expense entries that are already linked, or otherwise associated, with an itinerary data entry in the second database 106, and expense entries not of a type, or segment, stored in the second data base. An example of the latter is where the second data base 106 stores only travel-segment data entries, such as ARCH data entries, the engine 102 filters out expense data entries from the first database 104 that are not travel-segment data entries. Further in example, if the expense data entry in the first database 104 is tied to a credit-card charge, then the engine 102 can determine, from the merchant category code (MCC) provided with the credit-card data or the an expense spend category code provided with the credit-card data, for example, whether the expense data entry is a travel-segment-expense data entry. For example, the engine 102 can be configured to consider an expense data entry with a MCC of American Airlines® and an Expense Spend Category Code for airfare as a travel-segment-expense data entry.

Figure 2:
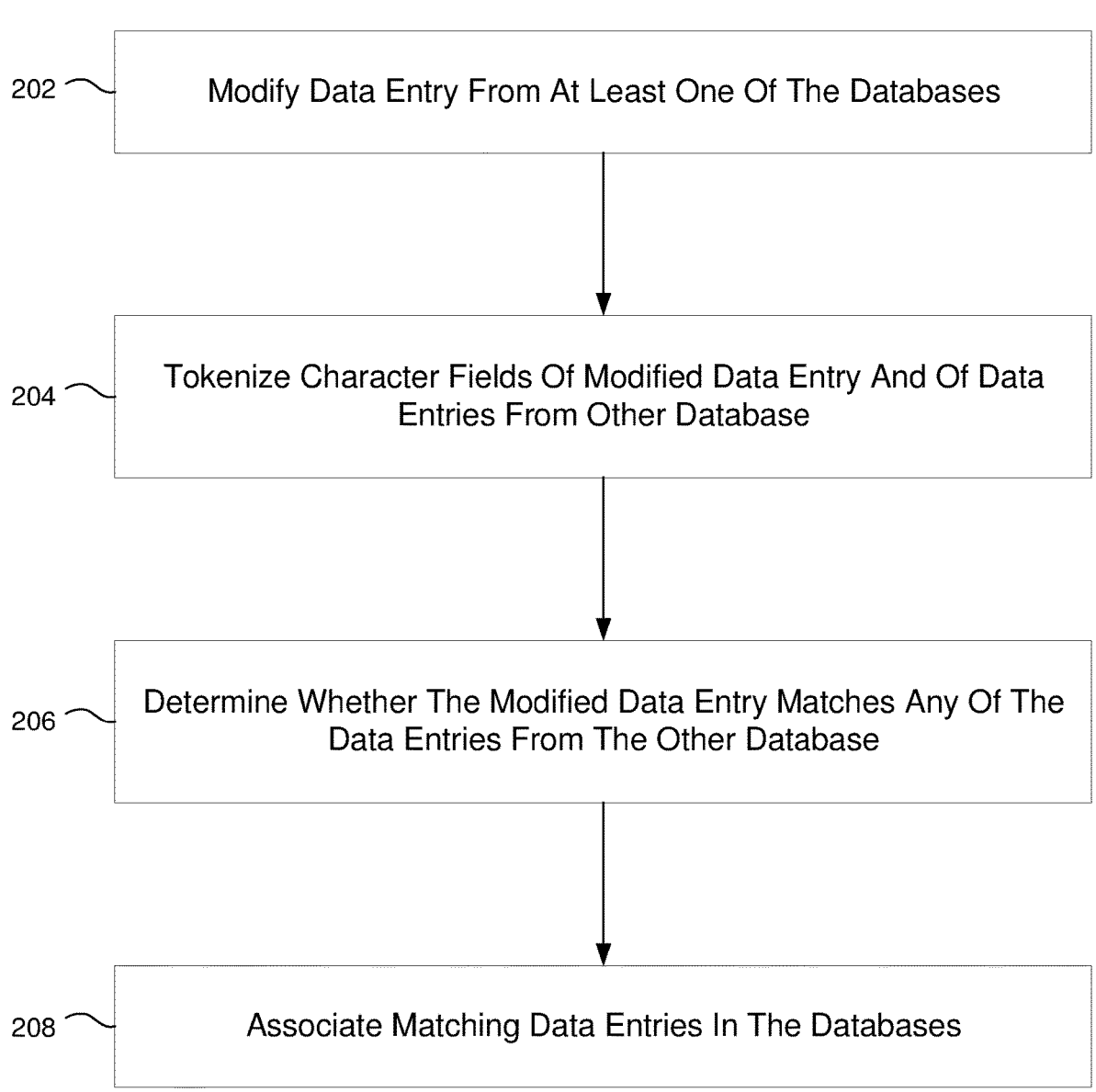
FIG. 2 illustrates a process for associating a data entry in one database with a corresponding data entry in another database, according to an embodiment.

FIG. 2 illustrates a flow diagram 200 of a process for matching a data entry from one database with a data entry from another database, and associating matched data entries, according to an embodiment.

Referring to FIGS. 1-2, a process for matching a data entry from one database with a data entry from another database, and for associating matched data entries, is described, according to an embodiment.

First, the engine 102 selects, from the data-entry store 112, a first data entry (originally from the first database 104) that the engine did not exclude during the above-described filtering process.

Next, referring to a step 202, the data-entry modifier 114 determines whether to modify the selected first data entry. A purpose of modifying the first data entry is to decrease the chance that the match determiner 118 will fail to match the first data entry to a corresponding second data entry from the second database 106 because the respective format of each of one or more character fields of the first data entry deviates too much from the formats of the character fields of the second data entry. For example, if the first data entry includes a character field "Bell West" to indicate the Westin Hotel in Bellevue, WA, but the corresponding second data entry includes a corresponding character field "Westin Hotel, Bellevue, WA," then the match determiner 118 may err and fail to find a match between the first and second data entries. That is, even though the match determiner 118 should find a match between the first and second data entries, it may fail to do so because the corresponding character fields are formatted so differently from one another.

Fortunately, however, the first data entry may include, or be associated with, multiple levels, or tables, of data, where the format of the data in at least one of the tables may be close enough to the format of the data in the second data entries to reduce the chances of the match determiner 118 erroneously failing to find a match. For example, where the first data entry includes an expense that was charged to a credit card, then the first data entry may have, or may be associated with, multiple levels, or tables, of data. For example, a first table may include a manual description, such as "Hotel," that the expense-reporter drafter typed in. A second table may be level 1, or card-transaction-level, credit-card data, which typically is data provided by a credit-card company and that appears on a card holder's credit-card statement. For example, the second table may include "New York Westin Hotel," where New York is the headquarters of the Westin Hotel chain, not the city, Bellevue, where the owner of the expense report stayed. A third table may be of level 2 credit-card data, which is typically more specific and complete than level 1 credit-card data, and a fourth table may be of level 3 credit-card data, which is typically invoice-level data that is more specific and complete than level 2 credit-card data. For example, the level 3 data may include "Westin Hotel Bellevue, WA," which is similar to the data format (hotel name and city/state of stay) of the second data entry from the second database 106. The data tables, which are stored in the first database 104, may be downloaded to the data-entry store 112 with each downloaded first entry. Alternatively, the data-entry modifier 114 may obtain the one or more data tables for a first data entry from the first database 104. And if the tables are of credit-card data, then the data-entry modifier 114 may obtain the credit-card data tables (e.g., level 1, level 2, and level 3 credit-card data).

The data-entry modifier 114 can be configured to include a previously determined ranking of the available data tables for the first data entry, and to modify the first data entry to include the data from the highest-ranked available table. For example, for a first data entry that includes a linked credit-card transaction, level 3 credit-card data may be ranked the highest, followed, in order, by level 2 credit-card data, level 1 (credit-card transaction) data, and manually entered data.

Consequently, if the data-entry modifier 114 determines that the first data entry does not include data from the highest-ranked available data table, then the data-entry modifier modifies the first data entry to include the data from the highest-ranked available data table. For example, if level 3 data is the highest-ranked data table and level 2 data is the second highest-ranked data table, but level 3 data is unavailable, then the data-entry modifier 114 modifies the first data entry to include the level 2 data if the first data entry does not already include the level 2 data. Further in example, the data-entry modifier 114 may append the data from the highest-ranked available data table to the existing first data entry or may overwrite the first data entry in the data-entry store 112 with the data from the highest-ranked available data table.

Conversely, if the data-entry modifier 114 determines that the first data entry already includes data from the highest-ranked available data table, then the data-entry modifier does not modify the first data entry. But for purposes of reference, the first data entry, after processing by the data-entry modifier 114, is, hereinafter, called the "modified first data entry," whether or not the data-entry modifier actually modified the first data entry. That is, it is understood that the modified first data entry may not actually be modified relative to the first data entry prior to processing by the data-entry modifier 114.

Next, referring to a step 204, the tokenizer 116 converts, into a respective first token, each of the one or more character fields of the modified first data entry, and converts, into second tokens, the character fields of all second data entries that are not already associated with respective first data entries from the first database 104. Alternatively, the tokenizer 116 may have already converted the character fields of the first data entry, or the character fields of the second data entries, into tokens as described above during the tokenization and token-weighting processes.

Then, at a step 206, the match determiner 118 determines whether the first data entry matches any of the not-already-associated second data entries. The match determiner 118 compares each first token to each second token, and generates, for each second data entry, a score that represents a likelihood that the second data entry matches the first data entry.

By comparing tokens, the match determiner 118 can increase matching accuracy as compared to comparing entire character fields. For example, suppose a character field of a second data entry includes a hotel name "Marriott Residence Inn," but the first data entry includes a misspelled hotel name "MariottResidents Inn." A comparison of only the character fields may erroneously yield no match due to the spelling and spacing errors in the first data entry, but a comparison of the tokens, where each of a majority of the first tokens equal at least one second token, properly yields a match. For example, with a window three characters long and a step size of one character, "Marriott Residence Inn" yields twenty tokens, and "MarriottResidents Inn" yields eighteen tokens. Because each of the following eleven of the eighteen first tokens matches a respective second token, the match determiner 118 detects a match between the character fields "MarriottResidents Inn" and "Marriott Residence Inn": MAR=MAR, RIO=RIO, IOT=IOT, OTT=OTT, RES=RES, ESI=ESI, SID=SID, IDE=IDE, DEN=DEN, _IN=_IN, and INN=INN.

Furthermore, the match determiner 118 may detect a match only if each of one or more character fields of the first data entry exactly matches a respective character field of the second data entry. For example, where the first data entry is an expense data entry and the second data entries are travel data entries, the match determiner 118 may detect a match only if the following character fields in both the first and second data entries are exact matches: entity ID (e.g., a ticket or confirmation number), user ID (e.g., the identification assigned to the person who submitted the expense report and who made the travel-segment purchase), and travel-segment type. For example, such exact matching can reduce the chances of a match being found between an expense entry submitted by one employee and a travel-segment expense incurred by another employee. The match determiner 118 can be configured to determine whether a character field is an exact-match character field by position of the character field within the data entry, a tag/header identifying the character field, or just from the length and character type of the character field. For example, the match determiner 118 can be configured to determine that a character field is a user ID field if the field is eight characters long and each character is a numeral. Furthermore, the tokenizer 116 may not tokenize character fields that are exact-match fields because the requirement of an exact match mitigates at least some of the advantages provided by tokens.

Moreover, in addition to detecting a match only if each of one or more character fields of the first data entry exactly matches a respective character field of the second data entry, the match determiner 118 may detect a match only if each of one or more other character fields of the first data entry at least partially matches a respective character field of the second data entry. For example, for first and second data entries for an airfare travel segment, the matching determiner 118 may require a partial match of at least two of the following character fields: a transaction number, transaction amount, a date, a vendor name, or a location (e.g., a city).

Embodiments of the disclosure may include generating a similarity search (e.g., an Elasticsearch®) comprising values for each parameter and a range for each parameter. For example, a transaction number may have a range specifying a minimum number of digits that match (e.g., 10 digits must match), an amount may have a range specifying a percentage (e.g., the amounts must match within +/−10%), and a date may have a range specifying a number of days for a match (e.g., +/−7 days). As mentioned above, certain character fields may be tokenized and weighted. Accordingly, a vendor name or location (or both) may tokenized and weighted using tf-idf as part of the similarity search, for example. Accordingly, examples of a partial match include the following. The second data entry may include leading zeros in the ticket number, and the first data entry may include no such leading zeros. Therefore, matching a set number (e.g., ten) of the rightmost digits of the ticket number may be considered a partial match of the ticket number, which effectively negates the leading zeros. Furthermore, the second data entry may include the departure date, but the first data entry may include the return date, so dates that are within a set number of days (e.g., seven days) of one another may be considered a partial match of the ticket date. Moreover, the second data entry may include the ticket price less taxes and fees, but the first data entry may include the total ticket price inclusive of taxes and fees, so prices that are within a set difference (e.g., ±10%) from one another may be considered a partial match of ticket price. Alternatively, if a first or second data entry includes a break out of fees like ticket price, taxes, airport fees, etc., then the tokenizer 116 may generate a sum of the fees, and tokenize only the sum so that, effectively, the match determinator 118 compares only fee totals.

As described above, the match determiner 118 determines whether there is an exact match of a character field based on the weight that the match determiner previously assigned to each token, and also on the number of token matches found. Alternatively, as described above, the tokenizer 116 may not tokenize character fields for which an exact match as required, and the match determiner 118 determines whether there is an exact match of a character field by comparing the character fields themselves, not tokens. For example, for entity ID character fields in the first and second data entries that both equal "19873", the match determiner 118 determines that the entity ID character fields yield an exact match.

Similarly, as described above, the match determiner 118 determines whether there is a partial match of a character field based on a weight that the match determiner previously assigned to each token, and also on the number of token matches found. For example, the match determiner 118 may determine that a character field of "$100.49" of a second data entry is a partial match of a character field of "$109.72" of the first data entry because these amounts are within ±10% of each other.

For each second data entry, the match determiner 118 determines a score based on the matching criteria and token weights described above, where the higher the score the more likely the second data entry is a match to the first data entry.

The match determiner 118 may, however, return only a predetermined number (e.g., ten) of the second data entries having the highest scores, and may select, as the matching second data entry, the second data entry having the highest score that is greater than a predetermined threshold. For example, if a score can range from 0-100, then the threshold may be 50 such that the match determiner 118 selects, as a match for the first data entry, only a second data entry having a highest score over the threshold 50.

If the match determiner 118 detects no matching second data entry for the first data entry, then the process 200 ends with no match being found for the first data entry. Of course, as more second data entries are added to the second database 106, a matching second data entry may be found for the first data entry a later time. That is, the match determiner 118 may repeat the step 206 for the first data entry at a later time after more second data entries are added to the data-entry store 112 from the second database 106.

But if the match determiner 118 finds a second data entry that matches the first data entry, then the match determiner identifies the matching pair of first and second data entries to the data-entry associator 120.

Referring to a step 208, the data-entry associator 120 links, or otherwise associates, the first data entry with the second data entry in one or both of the first and second databases 104 and 106. For example, the associator 120 may add to the first data entry a link to the second data entry in the second database 106, or vice-versa. Or the associator 120 may add to the first data entry an identifier of, or pointer to, the associated second data entry in the second database 106. The data-entry associator 120 may also associate the matching first and second data entries in the data-entry store 112.

Furthermore, the data-entry associator 120 may overwrite one or more data fields in the original first data entry in the first database 104 with data fields from the modified first data entry, thus replacing the original first data entry with the modified first data entry; likewise, the associator may overwrite the original first data entry in the data-entry store 112 with the modified first data entry if the data-entry associator has not already done so.

Alternatively, the data-entry associator 12 may overwrite the original first data entry in the first database 104 with data from the associated second data entry from the second database 106.

Still referring to FIGS. 1-2, alternative embodiments of the engine 102 and the procedure 200 are contemplated. For example, the tokenization window may have a character length that is less than or greater than three, and the tokenizer 118 may move the window in steps that are greater than one character long.

Figure 3:
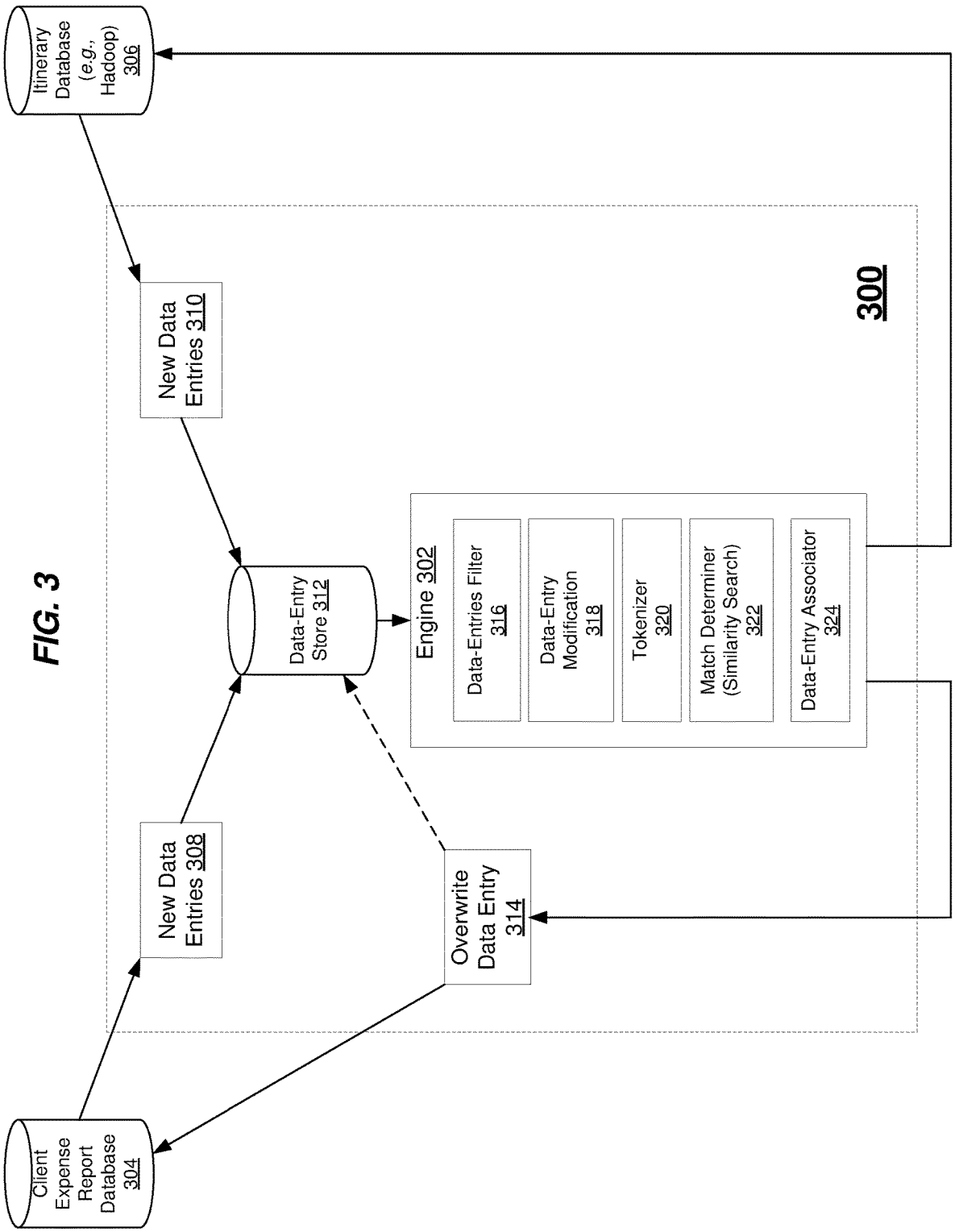
FIG. 3 illustrates an example architecture for associating a data entry in one database with a corresponding data entry in another database, according to an embodiment.

FIG. 3 illustrates an example architecture 300 for associating an expense-report data entry in one database with a travel-itinerary data entry in another database, according to another, example embodiment. Features and advantages of the present disclosure include automatically associating a data entry in an expense report stored in a client expense-report database with a data entry in a travel-itinerary report stored in an itinerary database. For example, if an employee's rental of a hotel room is stored in the itinerary database, and he/she enters the cost of the rental in his/her expense report stored in the client database, then the architecture 300 can associate the two data entries and can indicate the association in one or both of the databases.

Features and advantages of the present disclosure include a match-detection-and-data-entry-association engine 302, which is configured to detect a match between an expense data entry in a client expense-report database 304 and a travel-segment data entry in an itinerary database 306, and to link, or otherwise to associate, the expense and travel-segment data entries in at least one of the expense-report and itinerary databases. For example, the engine 302 is configured to associate previously unassociated expense data entry in an expense report stored in the client expense-report database 304 by matching the expense data entry to, and associating the expense data entry with, a travel-segment data entry stored in the itinerary database 306. Further, the client-expense-report database 304 may hold all expense reports of all clients of the expense-report-tool provider, and the itinerary database 306 may be the Hadoop database administered by the tool provider, for example.

In addition to the engine 302, the architecture 300 includes new-data-entries engines 308 and 310, a data-entry store 312, and a data-entry overwriter 314.

Furthermore, the engine 302 includes a data-entries-filter 316, a data-entry modifier 318, a tokenizer 320, a match determiner 322 (e.g., for determining exact or partial matches), and a data-entry associator 324.

Figure 4:
FIG. 4 illustrates an example process that occurs before associating a data entry in one database with a corresponding data entry in another database, according to an embodiment.

FIG. 4 is a diagram 400 of a pre-data-entry-matching process, according to an embodiment.

Referring to FIG. 3, the expense-report and itinerary databases 304 and 306 continuously receive new expense data and new travel data, respectively. That is, the expense-report database 304 continuously receives new expense reports each including one or more expense data entries, and the itinerary database 306 continuously receives new travel-segment data entries, such as ARCH-segment data entries.

Referring to FIGS. 3-4, at a step 402, each of the new-data-entries engines 308 and 310 periodically updates the data-entry store 312 with the new data entries in the expense-report database 304 and the itinerary database 306, respectively, such that the data-entry store includes all data entries from both the expense-report and itinerary databases for a set period of time. For example, the engines 308 and 310 may update the data-entry store 312 daily to include at least the most recent six months of data entries from both the expense-report and itinerary databases 304 and 306. The new-data-entries engines 308 and 310, or the engine 302, also can remove, from the data-entry store 312, data entries that are outside of the set period of time, for example, that are older than six months. In an embodiment, the engine 302, and the new-data-entries engines 308 and 310, are part of a Spark Coordinator engine.

At a step 404, the tokenizer 320 converts all of the character fields of all of the new expense-report and travel-segment data entries in the data-entry store 312 into tokens as the new-data-entries engines 308 and 310 update the data-entry store with new data entries. For example, the tokenizer 320 can use a "sliding window" of a set length to convert all of the character fields into tokens. Further in example, for the character field AMERICAN AIRLINES, for a window three characters long, and for a window step of one character, the tokenizer 320 effectively steps the three-character window from right to left, one character at a time, to generate the following tokens: AME, MER, ERI, RIC, ICA, CAN, AN_, N_A, _AI, AIR, IRL, RLI, LIN, INE, and NES. Due to the stepping of the window in one-character increments, the tokens overlap one another. For example, the first two tokens overlap with ME, the second and third tokens overlap with ER, and so on. If, however, the step size is greater than or equal to the window size, the tokens do not overlap. Moreover, the tokenizer 320 may not tokenize character fields (e.g., company ID, employee ID), that must match exactly for the engine 302 to find a match between an expense data entry and a travel-segment data entry.

Next, the tokenizer 320 weights each token with a value indicative of how helpful the token is anticipated to be, statistically, in indicating a match between data entries. For example, the tokenizer 320 can be, or can be part of, a similarity search engine (described below, e.g., Elasticsearch®) that is configured to weight each token with a tf-idf value. Further, the tokenizer 320 may weight the token AIR with a lower tf-idf value, for example, because many airlines include the word "Air" in their names, and, therefore, the discovery of the token AIR in two data entries is less likely to indicate that the data entries refer to the same airline. Conversely, the tokenizer 320 may weight the token DEL with a higher tf-idf value because fewer airlines (e.g., Delta®) include the string DEL in their names.

The tokenizer 320 then stores each token, and its corresponding weight, in the data-entry store 312, in another memory that the architecture 300 includes, or in another memory to which the architecture otherwise has access.

And at a step 406, the data-entries filter 316 detects, and effectively filters or screens out, expense data entries in the expense-report database 304 that are not candidates for matching to travel-segment data entries in the itinerary database 306. For example, the filter 316 may exclude, from the below-described matching inquiry, expense data entries in expense reports (from the database 304) that have not yet been submitted for approval, expense data entries in expense reports that have been submitted but have not yet been approved, expense data entries that are already linked, or are already otherwise associated, with a travel-segment data entry in the itinerary database 306, and expense data entries that are not for an ARCH segment. For example, if an expense data entry in the database 304 is linked, or otherwise associated with, a credit-card charge, then the filter 316 can determine whether the expense data entry is for an ARCH segment expense by analyzing the merchant category code (MCC) included with the credit-card data or the Expense Spend Category Code. Further, the filter 316 can be configured to determine that an expense data entry with a MCC of Hertz® and an Expense Spend Category Code indicating car rental is a travel-segment expense data entry, for example. Conversely, the engine can be configured to determine that an expense data entry with a MCC of 5814 and Expense Spend Category Code indicating food service is not a travel-segment expense data entry.

Figure 5:
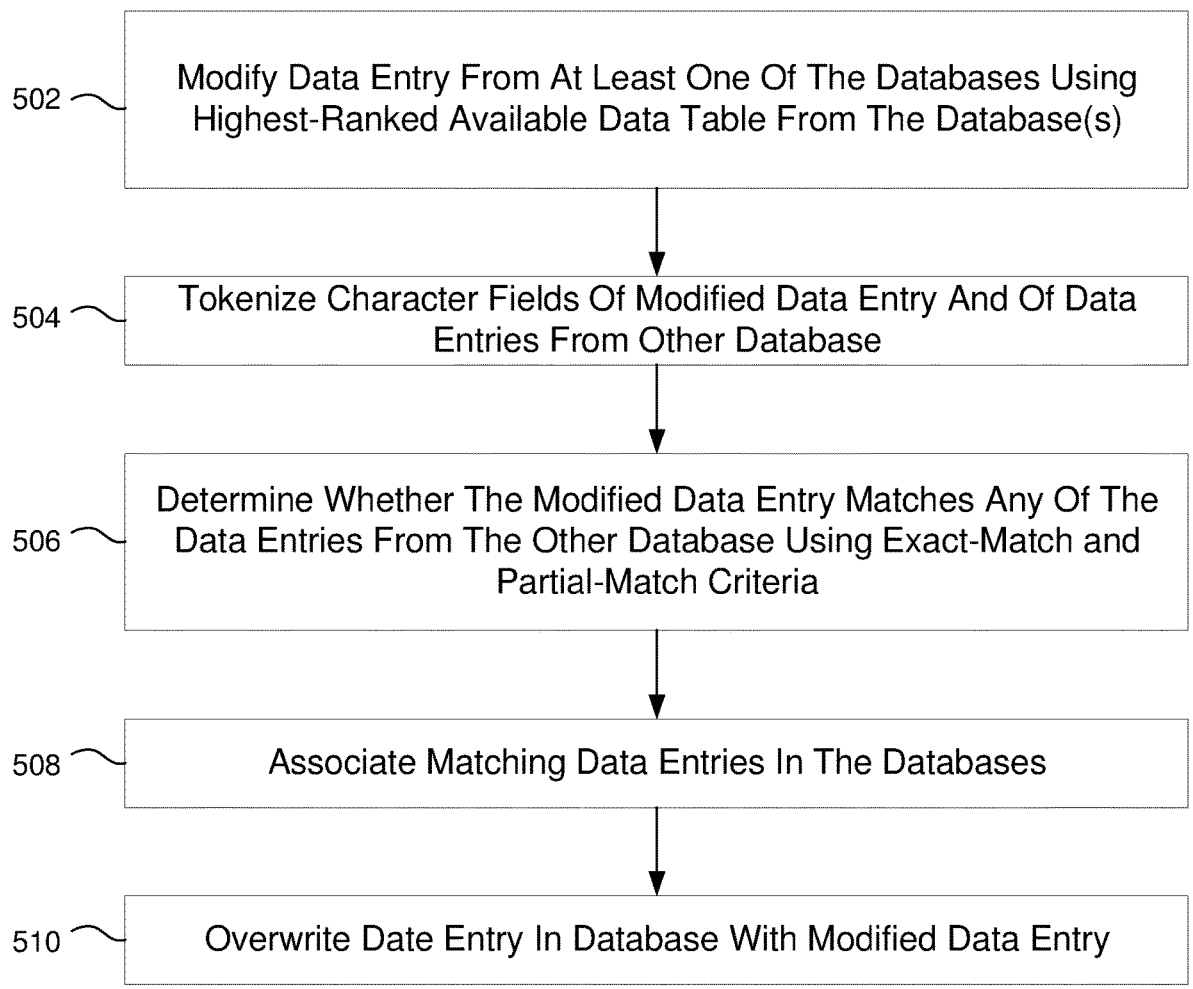
FIG. 5 illustrates an example process for associating a data entry in one database with a data entry in another database, according to an embodiment.

FIG. 5 illustrates a flow diagram 500 of a process for matching an expense data entry from the expense-report database 304 (FIG. 3) with a travel-segment data entry from the itinerary database 306 (FIG. 3), and linking, or otherwise associating, the matched data entries, according to an embodiment.

Referring to FIGS. 3 and 5, a process for matching expense data entries from the expense-report database 304 with respective travel-segment data entries from the itinerary database 306, and for associating the matched data entries, is described, according to an embodiment.

The engine 302 retrieves, from the data-entry store 312, an expense data entry (originally from the expense-report database 304) that the filter 316 did not exclude during the filtering process described above in conjunction with FIG. 4.

Next, at a step 502, the data-entry modifier 318 determines whether to modify the retrieved expense data entry. A purpose of modifying the expense data entry is to decrease the chance that the match determiner 322 will fail to match the expense data entry to a corresponding travel-segment data entry from the itinerary database 306 merely because the respective format of each of one or more character fields of the expense data entry deviates too much from the formats of the corresponding character fields of the travel-segment data entry. For example, if the expense data entry includes a character field "Red Mar" to indicate the Marriott Hotel in Redmond, WA, but the corresponding travel-segment data entry includes a corresponding character field "Marriott Hotel, Redmond, WA," then the match determiner 322 may err and fail to find a match between the expense and travel-segment data entries. That is, even though the match determiner 322 should find a match between these expense and travel-segment entries, the match determiner fails to do so because the corresponding character fields effectively "look" so different from one another.

Fortunately, however, the expense data entry may include, or be associated with, multiple levels, or tables, of data, where the format of the data in at least one of the tables may have a format that is suitably close to the format of the data in the travel-segment data entries. For example, where the expense data entry is for an expense that was charged to a credit card, then the expense data entry may have, or may be associated with, multiple levels, or tables, of data. For example, a first table may include a manually typed in description, such as "Hotel." A second table may be level 1, or card-transaction-level, credit card data, which is typically data provided by the credit-card company and that appears on a credit-card statement. For example, the second table may include "New York Marriott Hotel," where New York is the headquarters of the Marriott Hotel chain, not the city, Redmond, where the submitter of the expense report stayed. A third table may be level 2 credit-card data, which is typically more specific and complete than level 1 credit-card data, and a fourth table may be level 3 credit-card data, which is typically invoice-level data that is more specific and complete than level 2 credit-card data. For example, the level 3 data may include "Marriott Hotel Redmond, WA," which is similar to the data format (hotel name and city/state of stay) of the travel-segment data entry from the itinerary data base 306. The data tables, which may be stored in the expense-report database 304, may be downloaded to the data-entry store 312 with each downloaded expense data entry. Alternatively, the data-entry modifier 318 may obtain the one or more data tables for an expense data entry from the expense-report database 304, or from the credit-card company via the credit-card companies webserver.

The data-entry modifier 318 can be configured to include a previously determined ranking of the available data tables for the expense data entry, and to modify the expense data entry to include the data from the highest-ranked available table. For example, for an expense data entry that includes a linked credit-card transaction, level 3 data may be ranked the highest, followed, in order, by level 2 data, level 1 (credit-card transaction) data, and manually entered data, which is ranked the lowest.

Consequently, if the data-entry modifier 318 determines that the expense data entry does not include data from the highest-ranked available data table, then the data-entry modifier modifies the expense data entry to include the data from the highest-ranked available data table. For example, if level 3 data is the highest-ranked data table and level 2 data is the second highest-ranked data table, but level 3 data is unavailable, then the data-entry modifier 318 modifies the expense data entry to include the level 2 data if the expense data entry does not already include the level 2 data. Further in example, the data-entry modifier 318 may append the data from the selected data table to the existing expense data entry or may overwrite the expense data entry in with the data from the selected data table. Such appending and overwriting may occur in the data-entry store 312, or in a working memory that the data-entry modifier 318 uses.

Conversely, if the data-entry modifier 318 determines that the expense data entry already includes data from the highest-ranked available data table, then the data-entry modifier does not modify the expense data entry. But for purposes of reference, the expense data entry, after processing by the data-entry modifier 318, is, hereinafter, called the "modified expense data entry," whether or not the data-entry modifier actually modified the expense data entry. That is, it is understood that the term "modified" indicates that the expense data entry has been processed by the data-entry modifier 318 but does not necessarily indicate that data-entry modifier actually modified the expense data entry.

Next, referring to a step 504, the tokenizer 320 converts, into a respective expense token, each of the one or more character fields of the modified expense data entry, and converts, into travel-segment tokens, the character fields of all travel-segment data entries that are not already associated with respective expense data entries from the expense-report database 304. Alternatively, the tokenizer 320 may have already converted the character fields of the expense data entry, or the character fields of the travel-segment data entries, into tokens during the tokenization and token-weighting processes as described above in conjunction with FIG. 4. Furthermore, the tokenizer 320 may not tokenize character fields for which the match determiner 322 may require an exact match as described above in conjunction with FIG. 4 and as described below.

Then, at a step 506, the match determiner 322 determines whether the expense data entry matches any of the not-already-associated travel-segment data entries according to exact-match and partial-match criteria. The match determiner 322 compares each expense token to each travel-segment token, and generates, for each travel-segment data entry, a score that represents a likelihood that the travel-segment data entry matches the expense data entry. And if exact-match character fields are not tokenized, then the match determiner 322 also compares each such expense character field with each such travel-segment character field to generate the score.

By comparing tokens, the match determiner 322 can increase matching accuracy as compared to comparing entire character fields for which an exact match is not required. For example, suppose a character field of a travel-segment data entry includes a car-rental name "Enterprise," but the expense data entry includes a misspelled car-rental name "Enter Prise." A comparison of only the character fields may erroneously yield no match due to the spelling and spacing errors in the expense data entry, but a comparison of the tokens, where each of a majority of the expense tokens equals at least one travel-segment token, properly yields a match. For example, with a window three characters long and a step size of one character, "Enterprise" yields eight tokens, and "Enter Prise" yields nine tokens. Because each of the following six of the latter nine expense tokens matches a respective travel-segment token, the match determiner 322 detects a match between the character fields "Enterprise" and "Enter Prise": ENT=ENT, NTE=NTE, TER=TER, PRI=PRI, RIS=RIS, and ISE=ISE.

Furthermore, the match determiner 322 detects a match between an expense data entry and a travel-segment data entry only if each of one or more character fields of the expense data entry exactly matches a respective character field of the travel-segment data entry. For example, the match determiner 322 detects a match only if the following character fields in both the expense and travel-segment data entries are exact matches: company ID, user ID (e.g., the company-issued identification of the person who submitted the expense report and who made the travel-segment purchase), and travel-segment type. For example, such exact matching can reduce the chances of a match being found between an expense data entry submitted by an employee of one company and a travel-segment expense incurred by another employee of another company, of a match being found between an expense data entry submitted by one employee of a company and a travel-segment expense incurred by another employee of the same company, and of a match being found between an expense data entry for an airline ticket and a travel-segment expense for a rental car. The match determiner 322 can be configured to determine whether a character field is a character field that requires exact matching by, for example, a position of the character field within the data entry, a tag/header that is part of the data entry and that identifies the character field, or from the length and character type of the character field. For example, the match determiner 322 can determine that a character field is a user ID field if the character field is eight characters long and each character in the field is a number.

Moreover, in addition to detecting a match only if each of one or more character fields of the expense data entry exactly matches a respective character field of travel-segment data entry, the match determiner 322 detects a match only if each of one or more other character fields of the expense data entry at least partially matches a respective character field of the of the travel-segment data entry. In one embodiment, match determiner 322 may generate a multi-parameter similarity search comprising parameters to be searched and, for each parameter, a range. For example, for expense and travel-segment data entries for airfare, the matching determiner 322 may require a partial match of at least two of the following character fields: ticket number, ticket amount, ticket date, airline name, departure city, and destination city. Accordingly, the similarity search may comprise values and ranges for ticket number, ticket amount, ticket date, airline name, departure city, and destination city. Examples of a partial match include the following. The travel-segment data entry may include leading zeros in the ticket number, and the expense data entry may include no such leading zeros. Therefore, matching a set number (e.g., ten) of the rightmost digits of the ticket number may be considered a partial match of the ticket number, which partial match effectively negates the leading zeros. Furthermore, the travel-segment data entry may include the departure date, but the expense data entry may include the return date, so dates that are within a set number of days (e.g., seven days) of one another may be considered a partial match of the ticket date. Moreover, the travel-segment data entry may include the base ticket price less taxes and fees (or with the taxes and fees broken out separately from the base ticket price), but the expense data entry may include the total ticket price inclusive of taxes and fees, so prices that are within a set difference (e.g., ±10%) from one another may be considered a partial match of ticket price. And further to this latter example, the match determiner 322 may sum all broken-out fees in a character field before comparing the character field with another character field.

In addition, specified character fields may be grouped such that a match (either exact or partial) of one or more of the grouped character fields may count as fewer matches than the number of character fields in the group, or even as only a single match. For example, the character fields that include the name of a vendor and the city of the vendor may be grouped such that a match (either exact or partial) of one or both of the vendor and the city character fields counts as only a single match. Further in example, assume that both an expense data entry and a travel-segment data entry include the same vendor character field "Amtrak" and the vendor-city character field "Seattle." Even though both of these character fields match exactly, the match determiner 322 counts this as only a single exact match. One reason for so grouping character fields is that if they contain similar tokens, then one character field in one data entry may match two or character fields in another data entry. In this situation, counting each matching set of tokens or character fields as a respective match may generate a false match between data entries. For example, if an expense data entry includes a vendor name with the vendor city (e.g., Seattle Airlines), and also includes the vendor city (e.g., Seattle), in separate character fields, then a match between both the vendor name and the vendor city to a city character field "Seattle" in a travel-segment data entry counts only as a single match, because, in actuality, it is only the cities that are matching.

Next, the match determiner 322 determines whether there is an exact match of a character field based on the weight that the match determiner previously assigned to each token, and also on the number of token matches found. Alternatively, as described above, the tokenizer 116 may not tokenize character fields for which an exact match is required, and the match determiner 322 determines whether there is an exact match of a character field by comparing the character fields themselves, not tokens. For example, for company ID character fields in the expense and travel-segment data entries that both equal "19873", the match determiner 322 determines that the company ID character fields yield an exact match. Conversely, for company ID character fields in the expense and travel-segment data entries that respectively equal "19873" and "19872," the match determiner 322 determines that the company ID character fields do not yield an exact match.

Similarly, the match determiner 322 determines whether there is a partial match of a character field based on a weight that the tokenizer 320 previously assigned to each token, and also on the number of token matches found. For example, the match determiner 322 may determine that a character field of "$100.49" of a travel-segment data entry is a partial match of a character field of "$109.72" of the expense data entry because these amounts are within ±10% of each other.

Then, for each travel-segment data entry, the match determiner 322 determines a respective score based on the matching criteria (e.g., the number of partial and exact matches found between the character fields of the travel-segment data entry and the expense data entry) and the weights of the matching tokens as described above, where the higher the score the more likely the travel-segment data entry is a match to the expense data entry.

The match determiner 322 may, however, return only a predetermined number (e.g., ten) of the travel-segment data entries having the highest scores, and selects, as the matching travel-segment data entry, the travel-segment data entry having the highest score that is greater than a predetermined threshold. For example, if a score can range from 0-100, then the threshold may be 50 such that the match determiner 322 selects, as a match for the expense data entry, only a travel-segment data entry having a highest score over the threshold 50.

If the match determiner 322 detects no matching travel-segment data entry for the expense data entry, then the process ends with no match being found for the expense data entry. Because new travel-segment data entries are continually added to the itinerary database 306 as described above, the match determiner 322 may find a match for the expense data entry at later time. That is, the match determiner 322 may repeat the above-described process for the expense data entry at a later time after more travel-segment data entries are added to the data-entry store 312 from the itinerary database 306.

But if the match determiner 322 finds a travel-segment data entry that matches the expense data entry, then the match determiner identifies the matching pair of expense and travel-segment data entries to the data-entry associator 324.

Next, at a step 508, the data-entry associator 324 links, or otherwise associates, the expense data entry with the matching travel-segment data entry in one or both of the expense-report and itinerary databases 304 and 306. For example, the associator 324 may add to the expense data entry a hypertext or other link to the travel-segment data entry in the itinerary database 306, or vice-versa. Or, the data associator 324 may add to the expense data entry another type of item (e.g., a tag) that identifies the associated travel-segment data entry in the itinerary data base 306. The data-entry associator 324 may also associate the matching expense and travel-segment data entries in the data-entry store 312 in a similar manner.

Then, at a step 510, the data-entry associator 324 sends the modified expense data entry to the overwriter 314, which overwrites the original expense data entry in the expense-report database 304 with the modified expense data entry, thus replacing the original expense data entry with the modified expense data entry; likewise, the overwriter 314 may overwrite the original expense data entry in the data-entry store 312 with the modified expense data entry if the data-entry modifier 318 has not already done so. If the data-entry modifier 318 did not actually modify the expense data entry because the expense data entry already included data from the highest-ranked data table, the step 510 can be omitted. Alternatively, the overwriter 314 can overwrite the original expense data entry in the expense-report database 304 (and in the data-entry store 312) with data from the matching travel-segment data entry.

Still referring to FIGS. 3 and 5, alternative embodiments of the engine 302 and the procedure 500 are contemplated. For example, the tokenization window may have a character length that is less than or greater than three, and the tokenizer 320 may move the window in steps that are greater than one character long. Furthermore, the criteria for exact matching and partial matching may be different than described above. Moreover, character fields in the expense data entries and in the travel-segment data entries can include International Air Transport Association (IATA) codes, which include three-character codes for cities having airports.

Hardware

Figure 6:
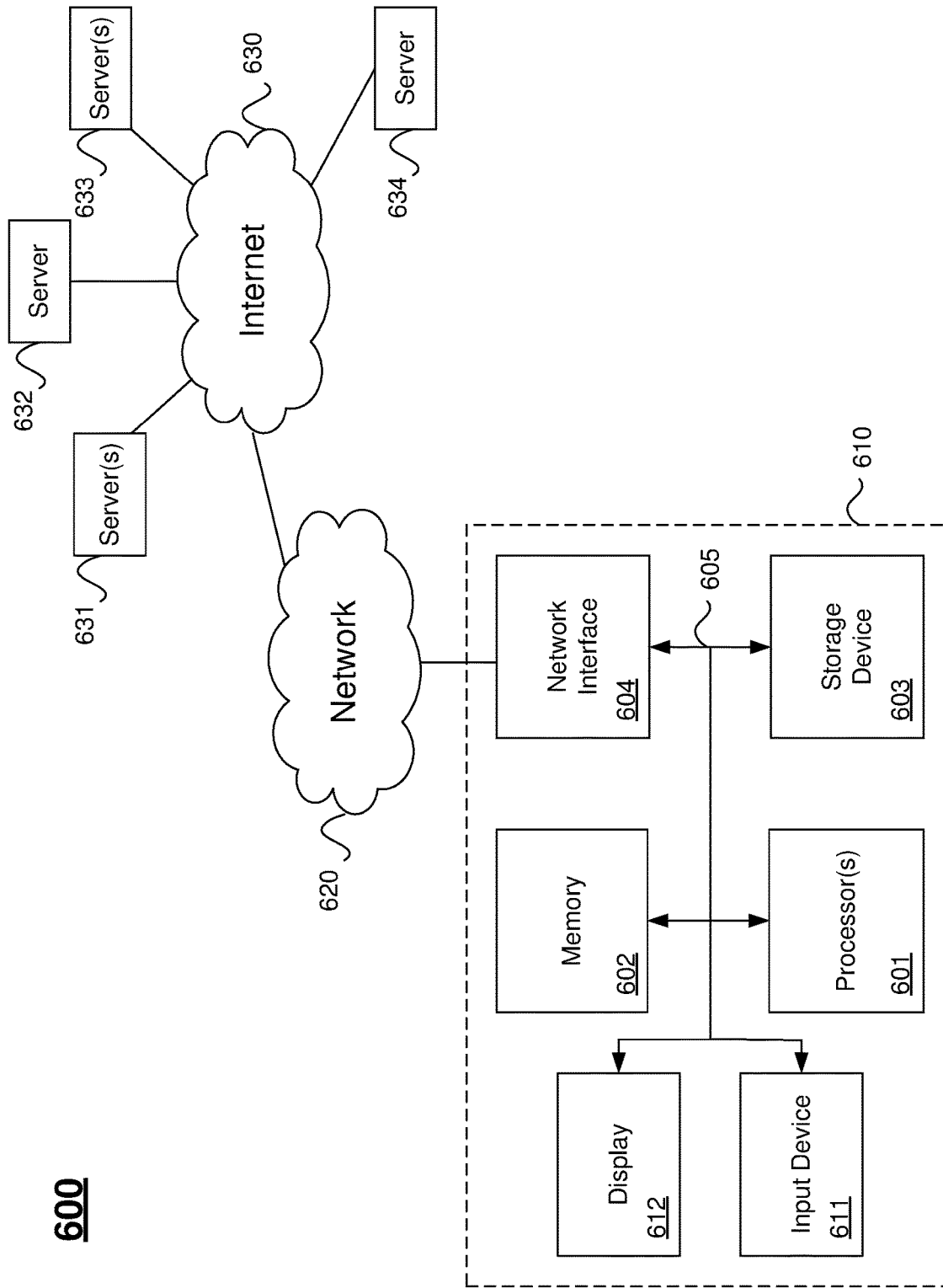
FIG. 6 illustrates hardware of a special purpose computing machine configured to operate and to function according to the present disclosure.

FIG. 6 illustrates hardware of a special purpose computing machine 500 configured according to the above disclosure. The following hardware description is merely one example. It is to be understood that a variety of computers topologies may be used to implement the above described techniques.

An example computer system 610 is illustrated in FIG. 6. Computer system 610 includes a bus 605 or other communication mechanism for communicating information, and one or more processor(s) (e.g., one or more microprocessors or microcontrollers) 601 coupled with bus 605 for processing information. Computer system 610 also includes a memory 602 coupled to bus 605 for storing information and instructions to be executed by processor 601, including information and instructions for performing some of the techniques described above, for example. Memory 602 may also be used for storing programs executed by processor(s) 601. Possible implementations of memory 602 may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device 603 and memory 602 are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses for coupling various components of the computer together, for example.

Computer system 610 also includes a network interface 604 coupled with bus 605. Network interface 604 may provide two-way data communication between computer system 610 and a local network 620. Network 620 may represent one or multiple networking technologies, such as Ethernet, local wireless networks (e.g., WiFi), or cellular networks, for example. The network interface 604 may be a wireless or wired connection, for example. Computer system 610 can send and receive information through the network interface 604 across a wired or wireless local area network, an Intranet, or a cellular network to the Internet 630, for example. In some embodiments, a browser, for example, may access data and features on backend software systems that may reside on multiple different hardware servers on-prem 631 or across the Internet 630 on servers 632-634. One or more of servers 632-634 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method, comprising:
   retrieving, by a computing device, a first entry from a data store, wherein the first entry and a set of available tables are downloaded from a first database to the data store, wherein the set of available tables corresponds to the first entry;
   determining, by the computing device, a data table in the set of available data tables stored in the data store is a highest-ranked data table;
   modifying, by the computing device, the first entry stored in the data store by including a set of data from the highest-ranked data table stored in the data store in the first entry;
   converting, by a tokenizer of the computing device, each of one or more character fields of the modified first entry into a respective one or more first-entry tokens;
   determining a first set of weights for the first-entry tokens based on a frequency of the first-entry tokens;
   retrieving a plurality of second entries from the data store, wherein the plurality of second entries are downloaded from a second database to the data store;

converting, by the tokenizer, each of one or more character fields of each of the plurality of second entries stored in the data store into a respective one or more second-entry tokens;
determining a second set of weights for the second-entry tokens based on a frequency of the second-entry tokens;
comparing, by the computing device, the first-entry tokens to the second-entry tokens;
determining, by the computing device, whether the first entry matches one of the second entries based on the comparison, the first set of weights for the first-entry tokens, and the second set of weights for second-entry tokens; and
associating, by the computing device, the first entry with one of the second entries in response to determining that the first entry matches the one of the second entries.

2. The method of claim 1, wherein modifying the first entry includes modifying the first entry in response to the first entry not being associated with a second entry before the modifying.

3. The method of claim 1, wherein each of the one or more available data tables includes a respective level of transaction data.

4. The method of claim 1, wherein modifying the first entry includes overwriting the first entry with data from the highest-ranked one of the one or more available data tables.

5. The method of claim 1, wherein:
converting each of one or more character fields of the modified first entry into a respective one or more first-entry tokens includes converting each of the one or more character fields into a respective plurality of overlapping first-entry tokens; and
converting each of one or more character fields of each of the pluralities of second entries in the second database into a respective one or more second-entry tokens includes converting each of the one or more character fields into a respective plurality of overlapping second-entry tokens.

6. The method of claim 1 further comprising determining that the first entry matches one of the plurality of second entries in response to:
at least one character field of the first entry exactly matching at least one character field of the one of the plurality of second entries; and
at least one other character field of the first entry at least partially matching at least one other character field of the one of the plurality of second entries.

7. The method of claim 1 further comprising determining that the first entry matches one of the plurality of second entries in response to:
each of a first plurality of character fields of the first entry exactly matching a respective character field of the one of the plurality of second entries; and
each of at least two of a second plurality of character fields of the first entry at least partially matching a respective character field of the one of the plurality of second entries.

8. The method of claim 1 further comprising determining that the first entry matches one of the plurality of second entries in response to:
each of a first plurality of character fields of the first entry exactly matching a respective character field of the one of the plurality of second entries;
each of at least one of a second plurality of character fields of the first entry at least partially matching a respective character field of the one of the plurality of second entries; and
each of at least one of a third plurality of character fields of the first entry at least partially matching a respective character field of the one of the plurality of second entries.

9. A system, comprising:
one or more processors; and
a non-transitory machine-readable medium storing a program executable by the one or more processors, the program comprising sets of instructions for:
retrieving, by the system, a first entry from a data store, wherein the first entry and a set of available tables are downloaded from a first database to the data store, wherein the set of available tables corresponds to the first entry;
determining, by the system, a data table in the set of available data tables stored in the data store is a highest-ranked data table;
modifying, by system, the first entry stored in the data store by including a set of data from the highest-ranked data table stored in the data store in the first entry;
converting, by a tokenizer of the system, each of one or more character fields of the modified first entry into a respective one or more first-entry tokens;
determining a first set of weights for the first-entry tokens based on a frequency of the first-entry tokens;
retrieving a plurality of second entries from the data store, wherein the plurality of second entries are downloaded from a second database to the data store;
converting, by the tokenizer, each of one or more character fields of each of the plurality of second entries stored in the data store into a respective one or more second-entry tokens;
determining a second set of weights for the second-entry tokens based on a frequency of the second-entry tokens;
comparing, by the system, the first-entry tokens to the second-entry tokens;
determining, by the system, whether the first entry matches one of the second entries based on the comparison, the first set of weights for the first-entry tokens, and the second set of weights for second-entry tokens; and
associating, by the system, the first entry with one of the second entries in response to determining that the first entry matches the one of the second entries.

10. The system of claim 9, wherein modifying the first entry includes modifying the first entry in response to the first entry not being associated with a second entry before the modifying.

11. The system of claim 9, wherein each of the one or more available data tables includes a respective level of transaction data.

12. The system of claim 9, wherein modifying the first entry includes overwriting the first entry with data from the highest-ranked one of the one or more available data tables.

13. The system of claim 9, wherein:
converting each of one or more character fields of the modified first entry into a respective one or more first-entry tokens includes converting each of the one or more character fields into a respective plurality of overlapping first-entry tokens; and
converting each of one or more character fields of each of the pluralities of second entries in the second database into a respective one or more second-entry tokens includes converting each of the one or more character fields into a respective plurality of overlapping second-entry tokens.

14. The system of claim 9, the program further comprising a set of instructions for determining that the first entry matches one of the plurality of second entries in response to:
   at least one character field of the first entry exactly matching at least one character field of the one of the plurality of second entries; and
   at least one other character field of the first entry at least partially matching at least one other character field of the one of the plurality of second entries.

15. The system of claim 9, the program further comprising a set of instructions for determining that the first entry matches one of the plurality of second entries in response to:
   each of a first plurality of character fields of the first entry exactly matching a respective character field of the one of the plurality of second entries; and
   each of at least two of a second plurality of character fields of the first entry at least partially matching a respective character field of the one of the plurality of second entries.

16. The system of claim 9, the program further comprising a set of instructions for determining that the first entry matches one of the plurality of second entries in response to:
   each of a first plurality of character fields of the first entry exactly matching a respective character field of the one of the plurality of second entries;
   each of at least one of a second plurality of character fields of the first entry at least partially matching a respective character field of the one of the plurality of second entries; and
   each of at least one of a third plurality of character fields of the first entry at least partially matching a respective character field of the one of the plurality of second entries.

17. A non-transitory machine-readable medium storing a program executable by at least one processor of a computer, the program comprising sets of instructions for:
   retrieving, by the computer, a first entry from a data store, wherein the first entry and a set of available tables are downloaded from a first database to the data store, wherein the set of available tables corresponds to the first entry;
   determining, by the computer, a data table in the set of available data tables stored in the data store is a highest-ranked data table;
   modifying, by the computer, the first entry stored in the data store by including a set of data from the highest-ranked data table stored in the data store in the first entry;
   converting, by a tokenizer of the computer, each of one or more character fields of the modified first entry into a respective one or more first-entry tokens;
   determining a first set of weights for the first-entry tokens based on a frequency of the first-entry tokens;
   retrieving a plurality of second entries from the data store, wherein the plurality of second entries are downloaded from a second database to the data store;
   converting, by the tokenizer, each of one or more character fields of each of the plurality of second entries stored in the data store into a respective one or more second-entry tokens;
   determining a second set of weights for the second-entry tokens based on a frequency of the second-entry tokens;
   comparing, by the computer, the first-entry tokens to the second-entry tokens;
   determining, by the computer, whether the first entry matches one of the second entries based on the comparison, the first set of weights for the first-entry tokens, and the second set of weights for second-entry tokens; and
   associating, by the computer, the first entry with one of the second entries in response to determining that the first entry matches the one of the second entries.

18. The non-transitory machine-readable medium of claim 17, wherein modifying the first entry includes modifying the first entry in response to the first entry not being associated with a second entry before the modifying.

19. The non-transitory machine-readable medium of claim 17, the program further comprising a set of instructions for determining that the first entry matches one of the plurality of second entries in response to:
   each of a first plurality of character fields of the first entry exactly matching a respective character field of the one of the plurality of second entries; and
   each of at least two of a second plurality of character fields of the first entry at least partially matching a respective character field of the one of the plurality of second entries.

20. The non-transitory machine-readable medium of claim 17, the program further comprising a set of instructions for determining that the first entry matches one of the plurality of second entries in response to:
   each of a first plurality of character fields of the first entry exactly matching a respective character field of the one of the plurality of second entries;
   each of at least one of a second plurality of character fields of the first entry at least partially matching a respective character field of the one of the plurality of second entries; and
   each of at least one of a third plurality of character fields of the first entry at least partially matching a respective character field of the one of the plurality of second entries.

* * * * *